J. O. VON STETTEN.

GARMENT FORMER.

APPLICATION FILED JULY 14, 1917.

Reissued Oct. 9, 1917.

14,374.

WITNESS:

Ph. R. Kitchel.

INVENTOR

Julius Otto Von Stetten

BY Frank D. Busser

ATTORNEY.

UNITED STATES PATENT OFFICE.

JULIUS OTTO VON STETTEN, OF PHILADELPHIA, PENNSYLVANIA, ASSIGNOR TO PHILADELPHIA METAL DRYING FORM COMPANY, OF WILMINGTON, DELAWARE.

GARMENT-FORMER.

14,374. Specification of Reissued Letters Patent. Reissued Oct. 9, 1917.

Original No. 1,221,394, dated April 3, 1917, Serial No. 104,136, filed June 16, 1916. Application for reissue filed July 14, 1917. Serial No. 180,675.

*To all whom it may concern:*

Be it known that I, JULIUS OTTO VON STETTEN, a subject of the Emperor of Austria, residing at Philadelphia, county of Philadelphia, and State of Pennsylvania, have invented a new and useful Improvement in Garment-Formers, of which the following is a full, clear, and exact description, reference being had to the accompanying drawings, which form a part of this specification.

The objects of my invention are to construct internally heated forms for the purpose of drying and partially shaping wearing apparel, especially hosiery, with a portion, especially the toe portion, detachable from the remainder of the iron.

I do not wish to be limited in my application to hosiery drying members but for purposes of illustration of wearing apparel have selected hosiery irons. I am also aware of the presence of heating members of various conformations in the art but am directing my disclosure and claims to the detachable toe.

My invention has for its specific purpose the reduction of the number of irons to produce a definite output. In laundries and knitting mills a large number of sizes of irons are necessary to finish the various sizes of hosiery. It is especially desirable that for half sizes, entirely different irons should not be necessary. The material variation in size in the foot portion in the various sizes lies in the length; for this reason a detachable toe is desirable since toe portions of different lengths may be used with one iron.

Simplicity, low cost of operation, labor saving and speed in operation are among my principal objects. With the above and other objects in view, my invention has relation to certain novel features of construction and operation, examples of which are described in the following specification and illustrated in the accompanying drawing in which:—

The iron is composed of two parts, the iron proper which is designated by 1 and a detachable toe 2; 3 designates a partition in the iron proper which terminates at 4 before reaching the point of the toe 5. The arrows indicate the possible circulation of the heating medium in the iron.

Figure 1:
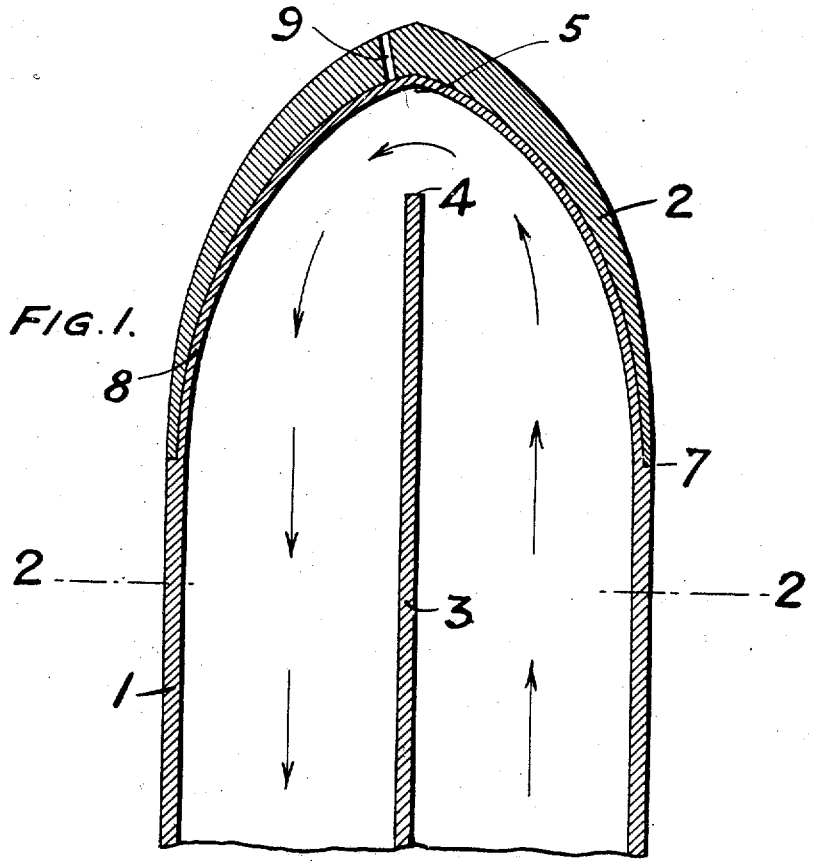
Figure 1 is a longitudinal fragmental sectional elevation of the foot and detachable toe portion of a hosiery iron.
Figure 2:
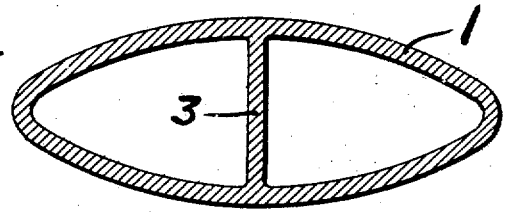
Fig. 2 is a cross-section taken on line 2—2 of Fig. 1.

The cross-section of the iron and toe is elliptical as indicated in Fig. 2.

The wall of the form proper 1, is countersunk at point 7, and continues so throughout its toe portion; 8 designates the wall of the toe portion. The section of the detachable toe portion 2 varies in thickness from that shown at point 7 to the thickness shown at the toe extremity; the thickness of the detachable toe portion at the toe extremity represents the increased length of the foot due to the use of the detachable toe. The inner surface of the detachable toe portion conforms exactly to the exterior surface of the wall 8 of the toe portion of the foot; 9 designates an air hole through the detachable toe portion.

The operation of my detachable toe is as follows: When put on it is simply slipped over the wall 8 and is held in position by the frictional contact. A slight pull on the detachable toe away from the iron proper, removes the detachable toe. The detachable toe is of such a wall thickness at its juncture with the iron proper that an absolute continuity of the external surfaces of the toe and iron proper results. Air holes 9 permits the escape of air when the detachable toe is being placed in position on the iron proper.

Having now fully described my invention, what I desire to claim and protect by Letters Patent is:—

1. The combination with a hollow detachable hosiery former, formed with a longitudinal partition therein so as to establish fluid communication between the hollow chambers formed by said partition, of a hollow detachable toe portion securable to said hollow hosiery former, and means for precluding fluid communication between said hollow hosiery former and said detachable toe portion.

2. The combination, with a hollow hosiery former having its toe portion countersunk and provided with a longitudinal partition therein arranged to establish fluid communication between the chambers formed by said partition, of a hollow detachable toe portion securable to the countersunk part of the former; the toe portion of the former being made imperforate to prevent the escape of the heating fluid from the former during the process of removing and replacing the detachable toe portion.

3. A hosiery former comprising a hollow chamber provided with a partition arranged to allow the circulation of a heating fluid along one side of the partition to the toe portion and thence back along the other side of the partition, the toe portion of the former provided with a double wall, the outer wall being detachable and the inner wall confining the heating fluid within the former during the removal and replacement of the outer wall.

4. In combination with a hollow hosiery former, formed with a longitudinal partition therein so as to establish fluid communication between the chambers formed by said partition, a hollow detachable toe portion, said toe portion secured to said hollow hosiery former by frictional contact, and means for precluding fluid communication between said hollow hosiery former and said detachable toe portion.

5. In combination with a hollow hosiery former, with its toe portion countersunk, formed with a longitudinal partition therein so as to establish fluid communication between the chambers formed by said partition, a hollow detachable toe portion of varying thickness, said toe portion secured to said hollow hosiery former proper by frictional contact, and means for precluding fluid communication between the said hosiery former and said detachable toe portion.

In testimony of which invention I have hereunto set my hand, at Philadelphia, Pennsylvania, on this 15th day of June, 1917.

JULIUS OTTO VON STETTEN.

Copies of this patent may be obtained for five cents each, by addressing the "Commissioner of Patents, Washington, D. C."